United States Patent
Jeong (10) Patent No.: US 6,751,373 B2
(45) Date of Patent: Jun. 15, 2004

(54) WAVELENGTH DIVISION MULTIPLEXING WITH NARROW BAND REFLECTIVE FILTERS

(75) Inventor: Hwan J. Jeong, Los Altos, CA (US)

(73) Assignee: Gazillion Bits, Inc., San Jose, CA (US)

(*) Notice: Subject to any disclaimer, the term of this patent is extended or adjusted under 35 U.S.C. 154(b) by 96 days.

(21) Appl. No.: 10/119,871

(22) Filed: Apr. 10, 2002

(65) Prior Publication Data

US 2002/0181046 A1 Dec. 5, 2002

Related U.S. Application Data

(60) Provisional application No. 60/282,760, filed on Apr. 10, 2001.

(51) Int. Cl.[7] .......................... G02B 6/28; G02B 27/14; H04J 14/02
(52) U.S. Cl. .................... 385/24; 385/47; 385/48; 359/634; 359/589; 398/85; 398/96
(58) Field of Search .................... 385/14, 24, 27, 385/39, 48, 47; 359/629, 631, 633, 634; 398/74, 85, 88, 96

(56) References Cited

U.S. PATENT DOCUMENTS

| | | | |
|---|---|---|---|
| 3,953,727 A | 4/1976 | d'Auria et al. | 398/88 |
| 4,550,975 A | 11/1985 | Levinson et al. | |

(List continued on next page.)

FOREIGN PATENT DOCUMENTS

| | | | | |
|---|---|---|---|---|
| GB | 2153546 A | 8/1985 | | G02B/27/14 |
| JP | 60150335 A | 8/1985 | | H04B/9/00 |
| JP | 63296006 A | 12/1988 | | G02B/6/12 |
| JP | 63304208 A | 12/1988 | | G02B/6/28 |
| JP | 02015723 A | 1/1990 | | H04B/10/10 |
| JP | 02033136 A | 2/1990 | | G02F/2/00 |
| JP | 05284113 A | * 10/1993 | | H04B/10/10 |
| JP | 10065651 A | 3/1998 | | H04J/14/00 |
| WO | WO0177724 | 10/2001 | | |

OTHER PUBLICATIONS

Bass, Michael et. al., *Handbook of Optics*: vol. 1, McGraw–Hill (1995), pp. 42.49–42.52.
Lemoff, Brian E., "WWDM Transceiver Module for 10 Gb/s Ethernet, IEEE 802.3 HSSG Interim Meeting, Coeur d'Alene, Idaho (Jun. 1999).

Primary Examiner—Hemang Sanghavi
Assistant Examiner—Scott A Knauss
(74) Attorney, Agent, or Firm—Cooper & Dunham LLP (57) ABSTRACT

A WDM demultiplexer/multiplexer comprising a plurality of narrow band reflective filters linearly disposed along an optical axis, each narrow band reflective filter reflecting a single channel or group of channels and transmitting the remaining channels, is described. In a demultiplexing mode, an optical signal initially carrying channels at $\lambda_1 \lambda_2 \ldots \lambda_N$ travels along the optical axis. Each narrow band reflective filter reflects a distinct channel and is tilted with respect to the optical axis such that it directs the reflected beam away from the optical axis to an output. Each narrow band reflective filter is substantially transparent to the remaining channels of the optical signal, such that the remainder of the optical signal proceeds along the optical axis substantially undisturbed. Advantageously, the device is highly robust against tilt variations or other mechanical variations in the narrow band reflective filters, because such variations are not compounded as the optical signal travels through the device. When many channels "N" require multiplexing/demultiplexing, the incoming beam may be split into "m" separate beams and sent to "m" separate narrowband reflective filter arrays, each comprising about N/m narrowband reflective filters. An optimal number of beams "m" for best energy efficiency may be computed based on specified system parameters.

8 Claims, 5 Drawing Sheets

U.S. PATENT DOCUMENTS

| | | |
|---|---|---|
| 4,637,682 A | 1/1987 | Mahlein et al. ............... 385/47 |
| 5,153,670 A | 10/1992 | Jannson et al. |
| 5,165,079 A | 11/1992 | Schulz-Hennig ............ 359/634 |
| 5,258,872 A | 11/1993 | Johnson et al. ............. 359/589 |
| 5,521,733 A | 5/1996 | Akiyama et al. ............. 398/48 |
| 5,629,995 A | 5/1997 | Duck et al. |
| 5,652,814 A | 7/1997 | Pan et al. |
| 5,754,718 A | 5/1998 | Duck et al. |
| 5,786,915 A | 7/1998 | Scobey |
| 5,917,626 A | 6/1999 | Lee |
| 5,933,260 A | 8/1999 | Cao et al. |
| 5,943,149 A | 8/1999 | Cearns et al. |
| 5,953,139 A | 9/1999 | Nemecek et al. |
| 6,008,920 A | 12/1999 | Hendrix |
| 6,031,952 A | 2/2000 | Lee |
| 6,055,347 A | 4/2000 | Li et al. |
| 6,212,312 B1 | 4/2001 | Grann et al. |
| 6,252,719 B1 | 6/2001 | Eichenbaum ............... 359/634 |
| 6,356,679 B1 | 3/2002 | Kapany ..................... 385/18 |
| 6,539,145 B1 | 3/2003 | Auracher et al. ............ 385/24 |
| 2002/0110316 A1 | 8/2002 | Kropp ........................ 385/24 |

\* cited by examiner

WAVELENGTH DIVISION MULTIPLEXING WITH NARROW BAND REFLECTIVE FILTERS

CROSS-REFERENCE TO RELATED APPLICATIONS

This application claims the benefit of Provisional Application Ser. No 60/282,760, filed Apr. 10, 2001, which is incorporated by reference herein.

FIELD

This patent specification relates to optical communications devices. More particularly, it relates to multiplexers/demultiplexers for use in wavelength division multiplexed (WDM) optical communications systems.

BACKGROUND

Wavelength division multiplexed (WDM) optical communication systems are based on the modulation of successive channels of information $f_i(t)$ onto successive optical carriers at wavelengths $\lambda_i$, which are then multiplexed onto a single fiber for transmission. In typical practical systems today, the bandwidth of each signal $f_i(t)$ may be about 10 GHz, the channel separation may be about 200 GHz (i.e. about 1.6 nm), and there may be about 20 channels being multiplexed onto the same fiber around a center wavelength of about 1540 nm. Thus, for example, a typical system may have 20 channels separately modulated onto carriers at 1530.0, 1531.6, 1533.2, 1536.8, . . . , 1560.4 nm, and the carriers are then optically combined into the same fiber for transmission. The above parameters are given by way of example only, the preferred embodiments described herein being applicable to any type of optical signal comprising a plurality of wavelength-division multiplexed signals at any of a variety of wavelengths.

Many useful devices in WDM communications systems are based upon WDM multiplexers/demultiplexers. Under the Principle of Reciprocity, most multiplexers are simply demultiplexers working in the opposite direction (and vice versa). Therefore, the preferred embodiments are described in terms of a demultiplexing function, it being understood that the preferred embodiments will operate as multiplexers in the opposite direction. The function of a demultiplexer is to receive a single optical beam carrying signals at $\lambda_1 \lambda_2 \lambda_3 \lambda_4 \ldots \lambda_N$ and generate N separate beams, each carrying a different one of the optical signals $\lambda_1, \lambda_2, \lambda_3, \lambda_4, \ldots,$ or $\lambda_N$.

Figure 1:
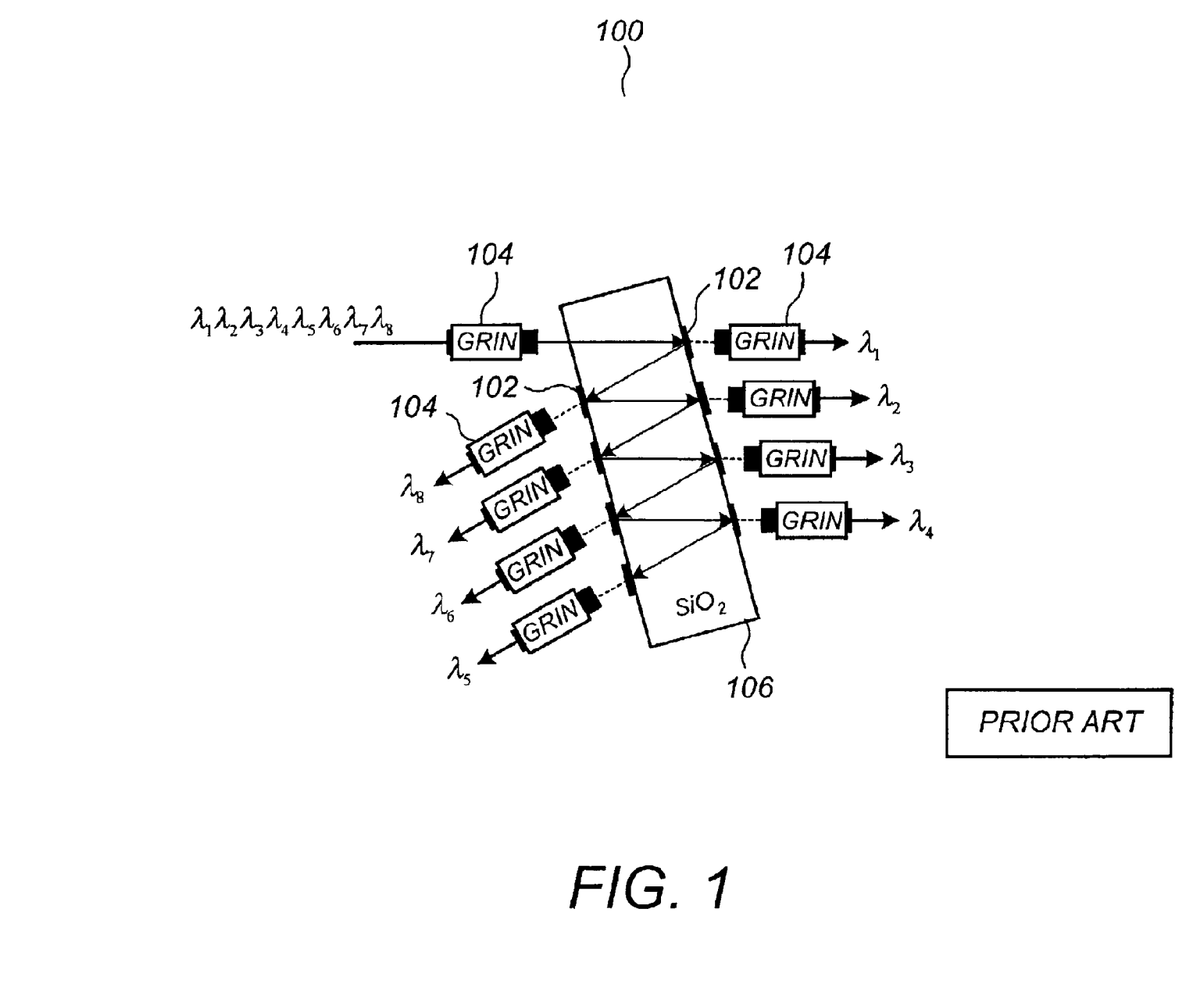
FIG. 1 illustrates a prior art wavelength division multiplexer/demultiplexer.

FIG. 1 illustrates a demultiplexer 100 according to the prior art, taken from Dutton, *Understanding Optical Communications*, Prentice-Hall (1998), which is incorporated by reference herein, in which narrow band transmissive-type dielectric thin film filters 102 are used. The thin film filters 102 are mounted on an $SiO_2$ substrate 106, with GRIN lenses 104 being used to collimate the optical beam between free space and optical fibers as necessary. For the wavelength ranges of interest, each thin film filter 102 is designed to reflect all wavelengths of light except a single wavelength $\lambda_i$, with each filter being tuned to its own distinct wavelength $\lambda_i$. After a first wavelength $\lambda_1$ is extracted at the first filter, the remaining wavelengths $\lambda_2 \lambda_3 \lambda_4 \ldots \lambda_N$ are sent on to the next filter. The next filter extracts $\lambda_2$, and the remaining wavelengths $\lambda_3 \lambda_4 \ldots \lambda_N$ are sent on to the next filter, and so on. It is to be appreciated that the demultiplexer 100 also operates as a multiplexer when operated in the reverse direction, and that only the demultiplexing direction is illustrated in FIG. 1 for clarity of presentation.

However, the use of transmissive type filters in a WDM demultiplexer results in difficulty in alignment, which is a major disadvantage. When the filters are transmissive, the "backend" wavelengths near $\lambda_N$ are inevitably reflected a large number of times before being directed to their final destinations. A misalignment $\Delta\theta$ of any reflecting surface along the way causes a $2\Delta\theta$ error in the trajectory of the reflected light beam from that surface onward. Even if every subsequent filter was perfectly aligned, the divergence of the beam from the intended path is equal to $2\Delta\theta$ (in radians) times the distance traveled to the final destination. This error can become even worse if one or more subsequent filters is also misaligned. Thus, even a small angular error in any reflecting surface can cause severe system performance degradation or even system failure. Because of this, every reflecting surface needs special care during fabrication and assembly. This drives up the cost of components and assembly.

It should be noted that Dutton, supra in FIG. 1, presents one method of dealing with the alignment, which is to use a precisely cut $SiO_2$ slab 106 as a substrate, carefully cut along the crystal axes so that the dielectric filters are precisely aligned. However, even this solution can be expensive, especially where cost savings are desired in as many aspects of a final product as possible. It would be desirable to use a less expensive material, such as plastic or standard glass, to hold the thin film filters. However, precise alignment using such low-cost materials would be very difficult, especially in view of their thermal sensitivity which can change the relative alignments in the event of uneven temperature distributions during the molding process or in field use.

Accordingly, it would be desirable to provide a WDM demultiplexer/multiplexer architecture that is more robust to small variations in the alignment of the channel filters.

SUMMARY

A WDM demultiplexer/multiplexer is provided comprising a plurality of narrow band reflective filters linearly disposed along an optical axis, each narrow band reflective filter reflecting a single channel or group of channels and transmitting the remaining channels. The narrow band reflective filters are each tilted with respect to the optical axis. In a demultiplexing mode, an optical signal initially carrying channels at $\lambda_1 \lambda_2 \ldots \lambda_N$ travels along the optical axis. Each narrow band reflective filter reflects a distinct one $\lambda_i$ of the channels, directing the reflected beam away from the optical axis at twice the tilt angle toward an output. Each narrow band reflective filter is substantially transparent to the remaining channels of the optical signal, such that the remainder of the optical signal proceeds along the optical axis substantially undisturbed. Advantageously, the device is highly robust against tilt variations or other mechanical variations in the narrow band reflective filters, because such variations are not compounded as the optical signal travels through the device.

In a multiplexing mode, a plurality of optical signals $\lambda_1, \lambda_2, \ldots, \lambda_N$ are separately provided at the above outputs, and a multiplexed signal $\lambda_1 \lambda_2 \ldots \lambda_N$ propagates out of the first narrow band reflective filter in a direction opposite the above optical signal. Preferably, the narrow band reflective filters are tilted less than 45 degrees with respect to the optical axis, and even better performance is achieved at less than 30 degrees. In one preferred embodiment, the narrow band reflective filters are dielectric thin film filters, while in another preferred embodiment they are holographic filters. A WDM demultiplexer/multiplexer in accordance with the preferred embodiments is readily adapted for use as a channel monitor and/or an add/drop multiplexer.

According to another preferred embodiment, when many channels "N" require multiplexing/demultiplexing, the incoming beam may be split into "m" separate beams and sent to "m" separate narrowband reflective filter arrays, each comprising about N/m narrowband reflective filters. Based on the number "N" and on system parameters such as beamsplitting loss and filter transmissivity, an optimal number for "m" may be determined based on a comparison of attenuation due to beam-splitting and attenuation caused by propagation through multiple serial filters.

DETAILED DESCRIPTION

Figure 2:
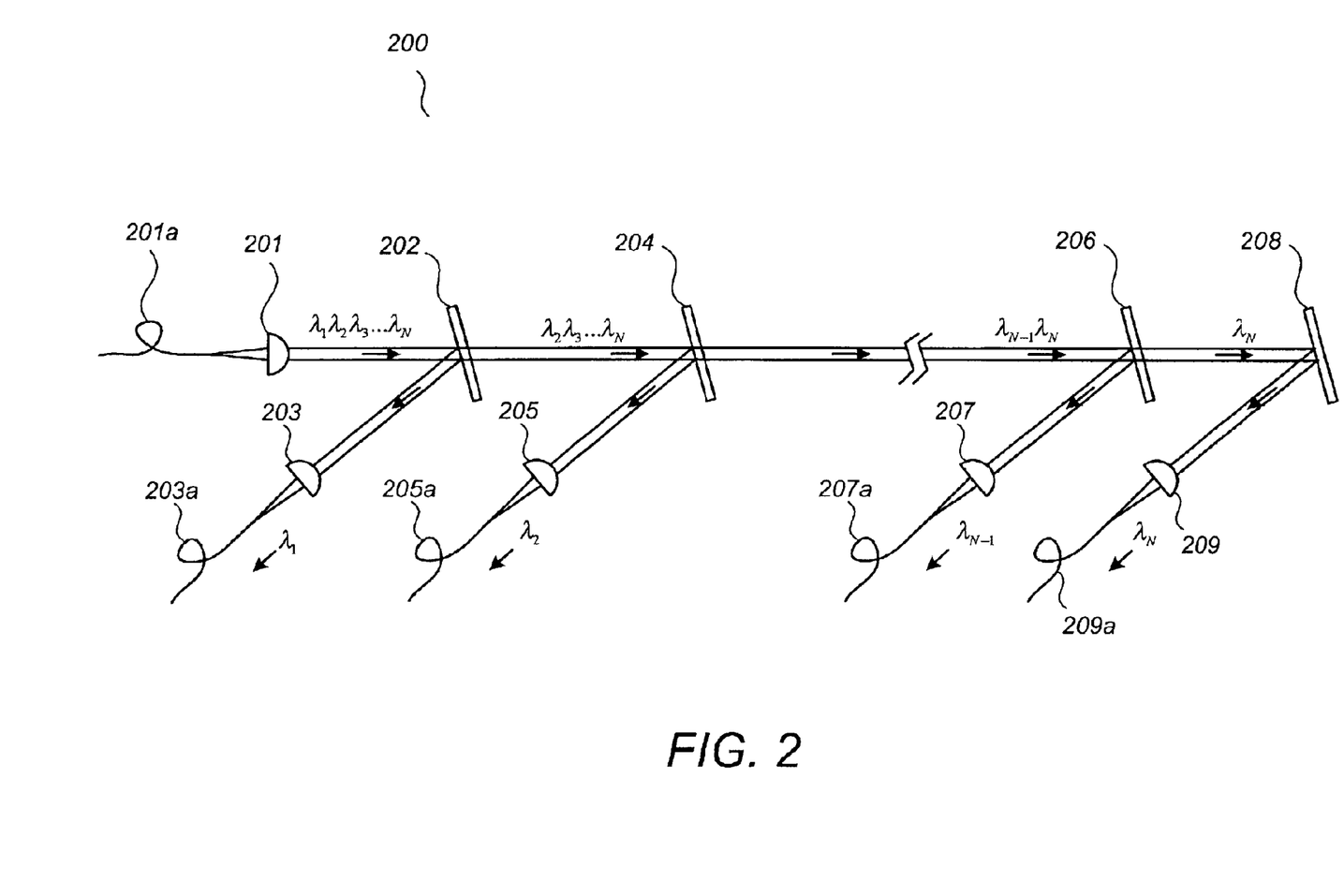
FIG. 2 illustrates a wavelength division multiplexer/demultiplexer in accordance with a preferred embodiment.

FIG. 2 illustrates a WDM demultiplexer/multiplexer 200 in accordance with a preferred embodiment, comprising a plurality "N" of dielectric thin film filters 202, 204, ..., 206, and 208 arranged in a linear array as shown in FIG. 2. WDM demultiplexer/multiplexer 200 further comprises an input collimating lens 201, such as a graded index (GRIN) lens, for coupling light from an input fiber 201 a, as well as similar output focusing lenses 203, 205, ... 207, and 209 for coupling the output signals to output optical fibers 203a, 205a, ... 207a, and 209a, respectively. Importantly, the dielectric thin film filters 202, 204, ..., 206, and 208 comprise narrow band reflective type filters, as opposed to the narrow band transmissive type filters used in FIG. 1. In other words, each filter is transparent to all wavelengths except the wavelength $\lambda_i$ to which that filter is tuned. Advantageously, small misalignments $\Delta\theta$ of any of the filters 202, 204, etc. will cause only negligible changes in the trajectory of the light beam, and divergence from the intended path is not worsened as the total path length increases. Furthermore, the narrow band reflective filters of FIG. 2 are expected to have the same fabrication cost, and possibly even a lower fabrication cost, than the narrow band transmissive filters of FIG. 1. Moreover, in addition to being more robust against fabrication errors that cause misalignment, the overall system is more robust against temperature variations, which can also induce misalignment due to uneven thermal expansions.

Preferably, the WDM demultiplexer/multiplexer 200 is configured and dimensioned such that the incidence angle of the light beam on each of the dielectric thin film filters 202, 204, ..., 206, and 208 is less than 45 degrees, and performance is even better is this angle is less than 30 degrees. This is because a smaller incidence angle will not only make the system performance less sensitive to filter misalignment, but also will also reduce polarization-dependent losses.

Thus, in accordance with a preferred embodiment, a WDM demultiplexer-multiplexer device is provided, the device being capable of spatially demultiplexing a WDM signal comprising channels at $\lambda_1\lambda_2\lambda_3\lambda_4 \ldots \lambda_N$, the device comprising a plurality of linearly arranged narrow band reflective filters, each narrow band reflective filter being designed to reflect a single wavelength $\lambda_i$ and reflect all other wavelengths in the WDM signal. Preferably, each narrow band reflective filter "i" is configured and adapted to have a box-like spectral response around its center wavelength $\lambda_i$, with a flat passband between $(\lambda_i-\Delta\lambda/2)$ and $(\lambda_i+\Delta\lambda/2)$, and zero at all other wavelengths in the incoming WDM signal, where $\Delta\lambda$ is the width of the passband. The passband width $\Delta\lambda$ will usually be near twice the modulation frequency, although other widths may also be used in accordance with the preferred embodiments. While in one preferred embodiment the respective channels are at successive adjacent wavelengths, i.e., $\lambda_1<\lambda_2<\lambda_3 \ldots <\lambda_N$, it is generally not necessary that the channel wavelengths be so arranged, and therefore many different orderings of the operative reflecting wavelengths of the successive thin film filters are within the scope of the preferred embodiments.

A WDM demultiplexer-multiplexer device in accordance with the preferred embodiments may be used in a variety of practical optical communications devices, especially where it is important to keep manufacturing costs low. One advantageous application is in coarse WDM channel monitors, used by field technicians in measuring the relative channel power in coarsely spaced WDM signals. Because of the coarse channel spacings involved, several low-cost components (e.g. filters, photodetectors) may be used, and use of the preferred embodiments for the WDM multiplexer-demultiplexer component helps keep overall costs low. It is to be appreciated, however, that the scope of advantageous uses of a WDM demultiplexer-multiplexer device in accordance with the preferred embodiments is much broader, and may include, for example, dense WDM (DWDM) channel monitors or other DWDM devices. Other advantageous applications of a WDM demultiplexer-multiplexer device include wavelength division multiplex transceivers and add/drop multiplexers. Other advantageous applications include use in a series of bandsplitters, wherein each of the narrow band filters reflects a plurality of channels at adjacent wavelengths and transmits the rest of the channels.

Figure 3:
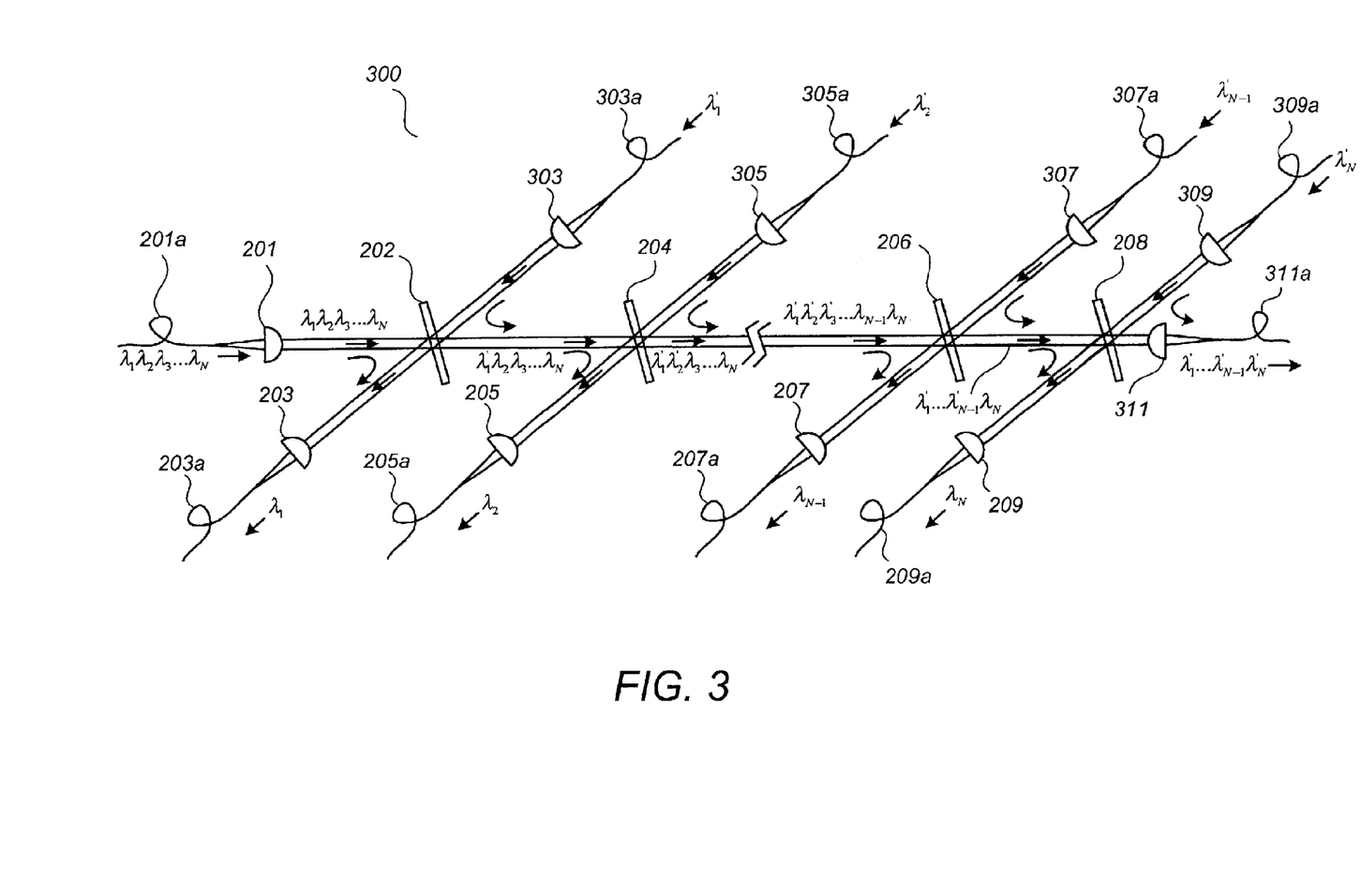
FIG. 3 illustrates an add/drop multiplexer in accordance with a preferred embodiment.
Figure 4:
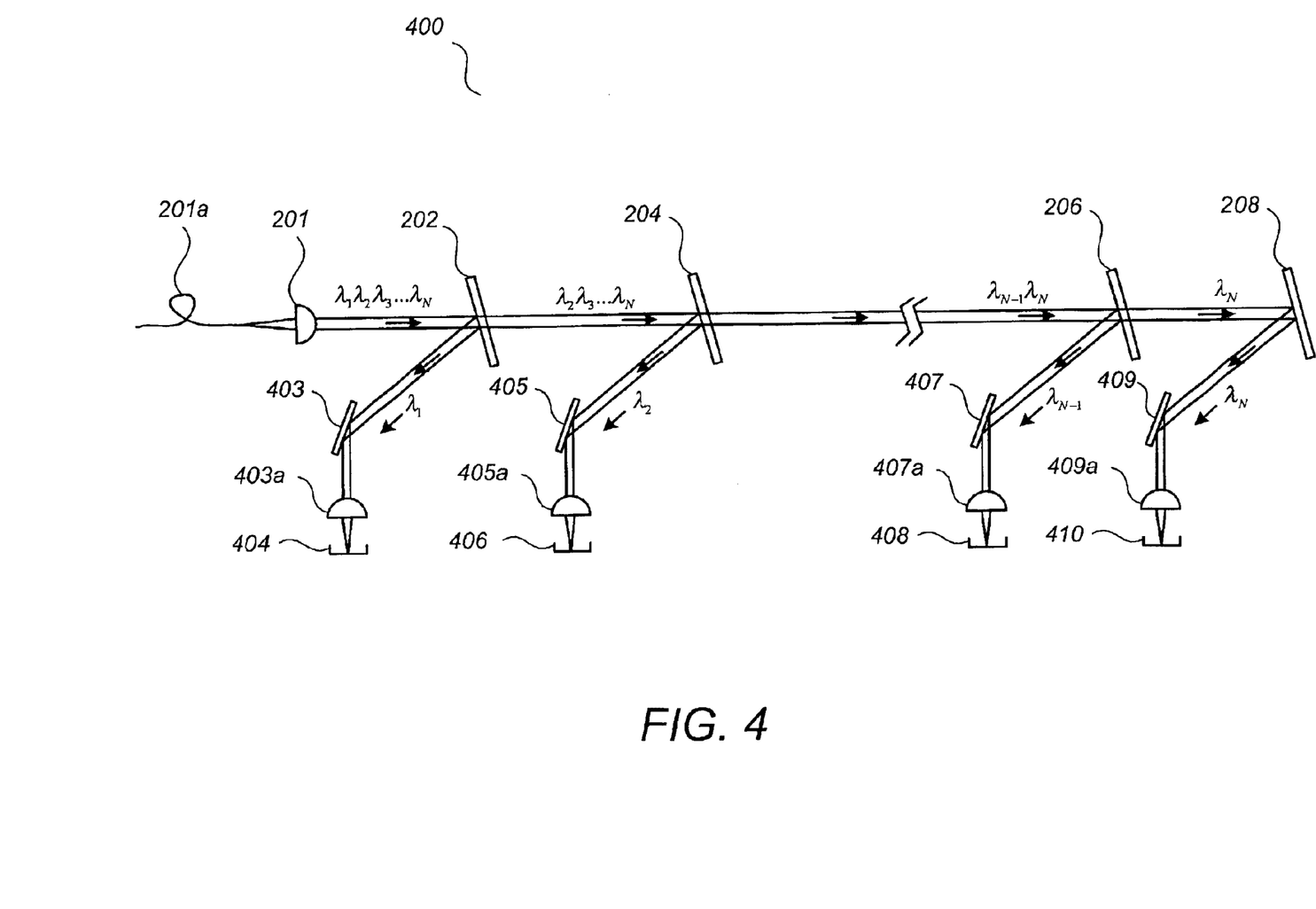
FIG. 4 illustrates a wavelength division multiplex receiver system in accordance with a preferred embodiment.

FIG. 3 illustrates the WDM multiplexer/demultiplexer of FIG. 2 reconfigured as an add/drop multiplexer 400, through the addition of collimating lenses 303, 305, ..., 307, and 309 for receiving replacement optical channel signals $\lambda_1'\lambda_2'\ldots\lambda_{N-1}'\lambda_N'$ from input fibers 303a, 305a, ..., 307a, and 309a, respectively, and through the addition of an output focusing lens 311 for outputting the signal containing $\lambda_1'\lambda_2'\ldots\lambda_{N-1}'\lambda_N'$ to an output fiber 311a. FIG. 4 illustrates the WDM multiplexer/demultiplexer of FIG. 2 reconfigured as a WDM receiver system, by placing mirrors 403, 405, ..., 407, and 409 and focusing lenses 403a, 405a, ..., 407a, and 409a such that the output optical channels are focused onto detectors 404, 406, ..., 408, and 410, respectively.

In the devices of FIGS. 2–4 according to the preferred embodiments, the accumulation of various errors that may occur in the prior art device of FIG. 1 is avoided and/or can be readily corrected. Let's take a look at possible error sources separately. First, there can be a tilt error of the thin film filter. This can cause a lateral shift (up or down in FIGS. 2–4) to transmitted light ray. However, this error will be small because (a) the thin film filter surfaces will be close-to-perpendicular to the incoming rays, and (b) the lateral shift is effectuated through refraction rather than reflection, causing the ray to bend by a much smaller amount. This becomes even less of an issue when a focusing lens is placed at each output port, as with the devices of FIGS. 2–4. This is because the focusing lens converts the lateral shift of light ray to more tolerable angular tilt at the output port.

Another type of possible error is slight wedge-type shape in the thin film filter plates. This can deviate the incident ray angularly. However, again, this error will be small because thin film filter plates can be made virtually without any wedge-type shape, and also the ray deviation angle is approximately only half of the wedge angle.

Another type of possible error is that there may be more multiple reflections between front and back surfaces of the thin film filters for the "backend" wavelengths than for "front-end" wavelengths. However, this can be reduced to an insignificant level with antireflection coatings on filter surfaces. Accordingly, WDM multiplexer/demultiplexer-based systems in accordance with the preferred embodiments are not only easier to align but also more robust and stable in the field than those based on the design of FIG. 1.

In order for a thin film structure to be a suitable narrow band reflective filter, it should meet three requirements. First, the films should not absorb light. Second, the period of film structure must be precisely half of the wavelength it is supposed to reflect. Third, the refractive index of film should vary continuously (sinusoidally, not abruptly) across the film structure, to provide a more ideal spectral response, as described in Bass et. al., *Handbook of Optics Volume* 1, McGraw-Hill (1995) at p. 42.51 et. seq., which is incorporated by reference herein.

Dielectric thin film filters are known in the art and are described, for example, in U.S. Pat. No. 5,153,670 (Jannson et. al.), which is incorporated by reference herein. In accordance with a preferred embodiment, it is preferable to use dielectric thin film filters whose index of refraction varies sinusoidally with depth, i.e., with respect to a direction "z" normal to the surface, or according to another appropriate function of "z" that provides for a properly apodized spectral response curve having a flat passband. Dielectric thin film filters with continuously varying refractive indexes are difficult to fabricate using film deposition techniques. It has been found that holographic filter construction techniques based on laser beam interference, such as those described in '670 patent, supra, are preferable over deposition methods in realizing the desired refractive index profile for the thin film filters.

In fabricating the preferred thin film filters, two collimated laser beams originated from same source go through photosensitive film from opposite sides. The two beams generate interference fringes inside the film and expose it. The exposure pattern copies the fringe pattern. By chemically processing the exposure pattern, the interference fringe pattern can eventually be converted to periodic non-absorbing film structure with sinusoidal variation of refractive index value. The period of interference fringes can be readily varied by changing the angle between two interfering beams. The direction of interference fringes can be made parallel to the film surface by making the incident-angle of two interfering beams the same. This technique provides two substantial advantages over film deposition techniques: a continuous (sinusoidal) variation of refractive index across the film, and an accurate control of the period. The final filter can have too much side lobes (ringing) on longer or shorter (not both) wavelength side of the reflection peak. However, this is not a serious issue because we need only one clean transmission side for WDM application.

A further refinement of the optical characteristics of thin film filter can be achieved by varying the amount of material refractive index variation across the film. This can be done either by varying the chemical composition of the film material across the film or manipulating post-exposure chemical processing.

We can alternatively also use material that does not require chemical processing. For example, we can create sinusoidal refractive index variation in germanium-doped glass or some polymer by interfering UV light inside the material. The sinusoidal refractive index variation can also be apodized by varying dopant concentration across the material. The filter can also be made with rewritable material like photorefractive crystals. Filters made with rewritable material provide tunability which is essential to reconfigurable WDM systems. Another suitable tunable filter that can be adapted for use in accordance with the preferred embodiments is described in WO 01/77724A1, and/or is contained in one or more products from Ondax, Inc. of Monrovia, Calif.

Figure 5:
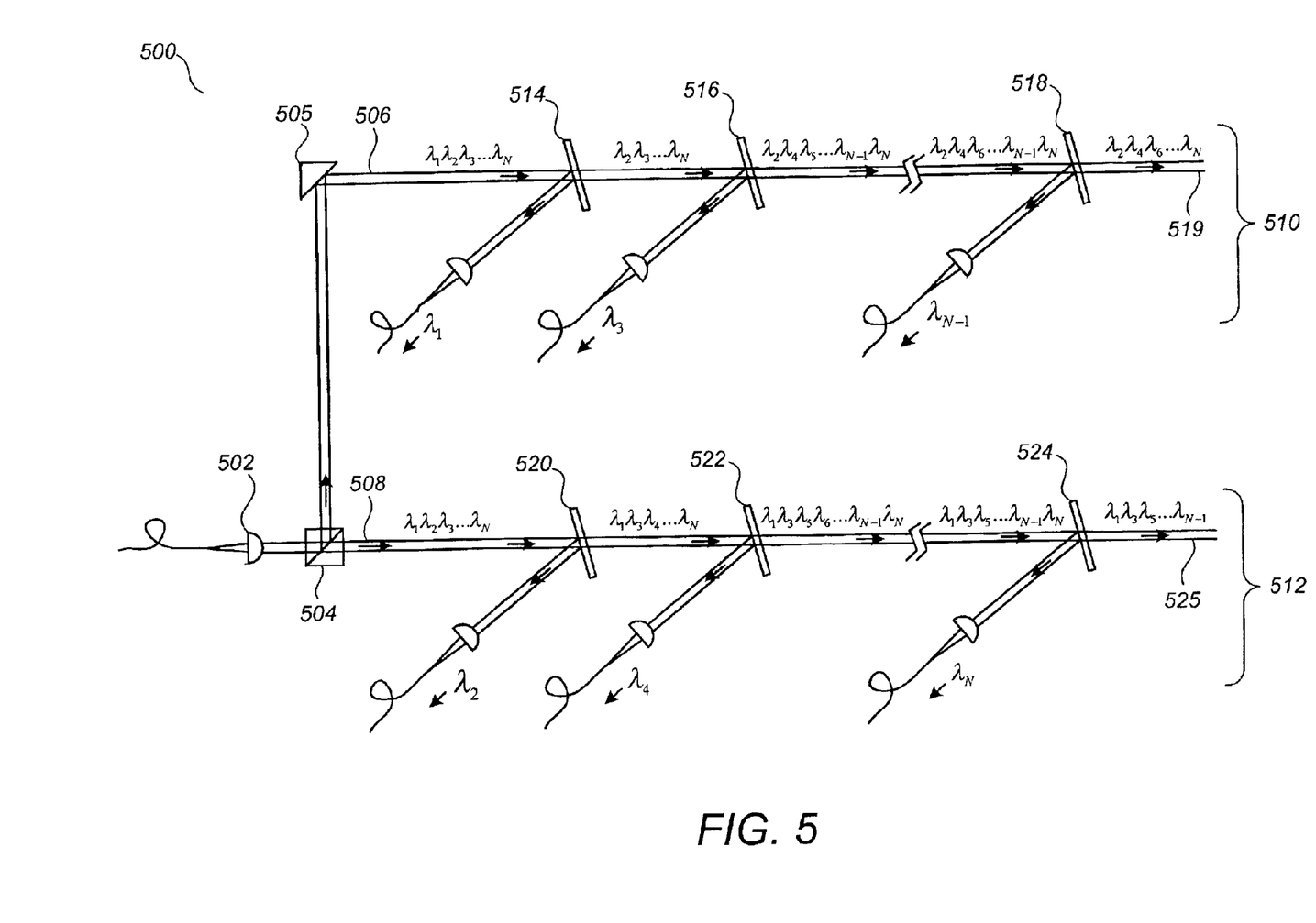
FIG. 5 illustrates a wavelength division multiplexer/demultiplexer in accordance with a preferred embodiment.

FIG. 5 illustrates a wavelength division multiplexer/demultiplexer 500 in accordance with a preferred embodiment. According to another aspect of the preferred embodiments, when many channels "N" require multiplexing/demultiplexing, the incoming beam may be split into "m" separate beams and sent to "m" separate ones of the devices of FIGS. 2–4 having N/m thin film filters each. Based on the number "N" and the system parameters, an optimal number for "m" may be chosen based on a comparison of (i) attenuation due to the initial beam-splitting (each split beam portion having about 1/m of the initial optical power of the input beam) versus (ii) attenuation caused by propagation through multiple serial filters.

Wavelength division multiplexer/demultiplexer 500 of FIG. 5 represents a simpler example in which m=2, comprising an input collimator 502, a beamsplitter 504, a first narrow band reflective filter array 510, and a second narrow band reflective filter array 512. Beamsplitter 504 splits the incoming beam equally into a first split-beam portion 506 that is directed via a fixed reflector 505 to the first narrow band reflective filter array 510 and a second split-beam portion 508 that is directed to the second narrow band reflective filter array 512. Each of the split-beam portions 506 and 508 initially comprise all WDM channels $\lambda_1 \lambda_2 \lambda_3 \lambda_4 \ldots \lambda_N$ at roughly half power compared to the input beam. For the present example, it is assumed that successive channels are at successive adjacent wavelengths, i.e., $\lambda_1 < \lambda_2 < \lambda_3 \ldots < \lambda_N$ and that N is an even number. The first narrow band reflective filter array 510 comprises N/m=N/2 narrow band reflective filters 514, 516, ..., 518 that reflect the odd channels $\lambda_1 \lambda_3, \ldots, \lambda_{N-1}$ to produce demultiplexed output signals at those channels, while the second narrow band reflective filter array 512 comprises N/m=N/2 narrow band reflective filters 520, 522, ..., 524 that reflect the even channels $\lambda_2, \lambda_4, \ldots, \lambda_N$ to produce demultiplexed output signals at those channels. A first unused signal comprising the even channels $\lambda_2 \lambda_4 \lambda_6 \ldots \lambda_N$ remains at the end 519 of the first narrow band reflective filter array 510, while a second unused signal comprising the odd channels $\lambda_1 \lambda_3 \lambda_5 \ldots \lambda_{N-1}$ remains at the end 525 of the second narrow band reflective filter array 512.

In other preferred embodiments, the logical groupings in the narrow band reflective filter arrays 510 and 512 can be different, e.g., the first narrow band reflective filter array 510 can operate on the first N/2 channels $\lambda_1, \lambda_2, \ldots \lambda_{N/2}$ and the second narrow band reflective filter array 512 can operate on the second N/2 channels $\lambda_{N/2+1}, \lambda_{N/2+2}, \ldots \lambda_N$. A variety of different logical groupings in the narrow band reflective filter arrays is within the scope of the preferred embodiments. In another preferred embodiment having even better thermal stability than the embodiment of FIG. 5, the fixed reflector 505 is omitted and the first narrow band filter array 510 is oriented at 90 degrees with respect to the second narrow band filter array 512. This prevents any deviation in the trajectory of the first split beam portion 506 that might be caused by changes or errors in the orientation of the fixed reflector 505.

Determination of the parameters "m" (number of filter rows) and "n" (number of channels or narrow band filters per row) for efficient optical power performance is now described. The intensity of signal light decreases exponentially as it propagates through a single row of filters in series, i.e., after passing through "k" thin film filters each having a transmissivity of T for the passed channels, the channels remaining have their powers attenuated by $T^k$. If a given channel is then reflected at the next filter having a reflectivity R for that channel, the output signal power for that demultiplexed channel is $(T^k)(R)$. Typical values for T and R will generally fall within the range of about 80%–96% although the scope of the preferred embodiments is not so limited.

The exponential decrease of transmitted signal power through the multiple filters indicates that if the number of filters is larger than some specific value, it may be better to arrange them into two rows of filters rather than one row. In this case, the input beam is split into two beams using a simple beam splitter that does not have any wavelength selectivity. The simple beam splitting will reduce the intensity of input beam to each row of filters to half of the original input beam intensity. However, thanks to the shorter length of the filter rows, this scheme can still provide higher intensity for the weakest signal, the last/first demultiplexed/multiplexed signal. Therefore, it may not be a good idea to put a large number of filters in single row. It will be better to split one long row into m=2 rows in order to get higher signal intensity. Thus, the maximum number of filters that can be put in a single row energy-effectively is determined by the following simple condition.

$$T^{n-1} \geq \frac{1}{2} T^{\frac{n}{2}-1} \text{ or} \quad (1)$$

$$(n-1)\log T \geq \left(\frac{n}{2}-1\right)\log T - \log 2 \quad (2)$$

where n=number of filters in single row
T=percentile signal transmissivity of each filter From equation (2), the maximum number of filters that can be put in single row before necessitating a second row becomes $$n_{max} = \frac{\log 4}{-\log T} = \frac{6.0206}{-10 \cdot \log_{10} T} \quad (3)$$

(Note: Equation (3) remains the same except T→R for narrow band transmissive filters. Equation (3) can also be applied to band splitters.)

By way of nonlimiting numerical example of the application of Eq. (3), suppose that the transmissivity T of each thin film filter is 0.88. This yields a value of $n_{max}$=10.85. Accordingly, if the number of channels is less than or equal to 10, it is preferable to use only a single narrow band reflective filter array, and not to split the beam into two portions. If the number of channels is greater than 10 it is better to split the beam into two portions and apply each split-beam portion to a separate narrow band reflective filter array.

One of inexpensive ways of building a WDM is combining regular beam splitters and filters. This kind of WDM will be very lossy because of the non-wavelength-selectivity of beam splitters. However, this kind of WDM may find usefulness in some low cost applications. In its configuration, a group of beam splitters split the input beam to "m" different beams with the same intensity and each of the sub beams propagates through the same number of filters. A basic issue for this kind of WDM is to determine the optimum number of filters "n" in single row. This question can be answered by optimizing the intensity of weakest signal. The weakest signal is the one that went through the largest number of filters. Therefore, the intensity of weakest signal, $I_w$, in each filter row is $$I_w = \frac{n}{N} T^{n-1} R = \frac{R}{TN} n T^n \quad (4)$$

where n=number of filters in each row of filters
N=mn=total number of wavelength channels.
T=transmissivity of each filter for transmitted wavelength channels
R=reflectivity of each filter for reflected wavelength channel By differentiating equation (4) with n and setting it to zero, we can get the optimum number of filters in each row of filters. That is, $$0 = \frac{\partial I_w}{\partial n} = \frac{RT^{n-1}}{N}(1 + n \ln T) \quad (5)$$

The optimum number of filters in single row becomes, $$n_{opt} \approx \frac{1}{-\ln T} = \frac{4.343}{-10 \cdot \log_{10} T} \quad (6)$$

(Note: Equation (6) remains the same except T→R for narrow band transmissive filters. Equation (6) can also be applied to band splitters. Also, by splitting the input beam into two, a WDM system with no wavelength skip can be made using wavelength skipping band splitters. The overall insertion loss can be lower with this approach because wavelength skipping band splitters will be less lossy than non-skipping ones.) Equation (6) shows that the optimum number of filters in single row generally does not depend on the total number of wavelength channels.

By way of nonlimiting numerical example of the application of Eq. (6), supposing again that the transmissivity T of each thin film filter is 0.88, a value of $n_{opt}$=7.82 is yielded. Because of the quantized nature of the configuration, the number $n_{opt}$ represents a guidepost that should be approximated, but it will often not be exactly matched. Most generally, in the present example, for a given number of channels "N", there should be a number of rows "m" that results in a number of channels per row of about 8. Thus, for example, if there are N=24 channels, there should be m=3 rows of n=8 channels each; if there are N=40 channels, there should be m=5 rows of n=8 channels each; if there are N=80 channels, there should be m=10 rows of n=8 channels each. If N lies between multiples of 8, e.g., N=36, there can be slightly less than 8 channels in some rows, e.g., a 5-row system can be selected with one of the rows having 8 channels each and 4 of the rows having 7 channels each. Alternatively, there can be slightly more than 8 channels in some rows, e.g., a 4-row system can be selected with each row having 9 channels.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments are not intended to limit their scope, which is limited only by the scope of the claims set forth below.

What is claimed is:

1. An apparatus for demultiplexing an input optical signal carrying a plurality of channels, comprising:

a splitting device for dividing the input optical signal into a plurality of distinct free-space sub-beams, each sub-beam also carrying said plurality of channels; and for each sub-beam, a distinct narrow band reflective filter array, said narrow band reflective filter array comprising a plurality of narrow band reflective filters linearly disposed along an optical axis extending in a direction of propagation of said sub-beam, each narrow band reflective filter reflecting a distinct one of said plurality of channels and being tilted with respect to said optical axis such that the reflected channel is directed away from the optical axis to an output, each narrow band reflective filter being substantially transparent to the remaining channels of the sub-beam and allowing a remainder of the sub-beam to proceed therethrough along said optical axis, said optical device being robust against tilt variations in said narrow band reflective filters because said tilt variations have minimal impact on the direction of said remainder of the sub-beam passing therethrough.

2. The apparatus of claim 1, wherein said splitting device divides the input optical signal substantially equally among said sub-beams, and wherein said plurality of narrow band reflective filter arrays each have roughly the same number of narrow band reflective filters.

3. The apparatus of claim 2, wherein all of said narrow band reflective filters reflect approximately the same percent "R" of the energy of their associated reflected wavelength, and wherein all of said narrow band reflective filters transmit approximately the same percent "T" of the energy of the remaining channels of the sub-beam.

4. The apparatus of claim 3, said input optical signal comprising "N" channels, said splitting device dividing the input optical signal into "m" sub-beams, each of said plurality of narrow band reflective filter arrays having roughly the same number "n" of narrow band reflective filters, wherein "n" is approximately equal to N/m.

5. The apparatus of claim 4, each of said sub-beams having an optical energy inversely proportional to the number of sub-beams "m", and wherein "m" is equal to an optimal value $m_{opt}$ that minimizes the overall attenuation of the final output channel of each narrow band reflective filter array in view of (i) the attenuation caused by the splitting of the input optical signal into "m" sub-beams, and (ii) the attenuation of a given sub-beam as it propagates through the approximately n=N/m narrow band reflective filters in its respective narrow band reflective filter array.

6. The apparatus of claim 5, wherein $m_{opt}$ is computed as being roughly equal to $N/n_{opt}$, and wherein $n_{opt}$ is determined by maximizing the expression $nT^n$ with respect to n.

7. The apparatus of claim 6, wherein $n_{opt}$ is approximately equal to $(-\ln T)^{-1}$.

8. The apparatus of claim 1, wherein the number of sub-beams corresponds to a value that minimizes the overall attenuation of a weakest output of any narrow band reflective filter in view of (i) the attenuation caused by the splitting of the input optical signal into that number of sub-beams, and (ii) the attenuation of a given sub-beam as it propagates through the narrow band reflective filters in its respective narrow band reflective filter array.

* * * * *